(12) United States Patent
Monteleone et al.

(10) Patent No.: US 11,347,402 B2
(45) Date of Patent: May 31, 2022

(54) PERFORMING WEAR LEVELING OPERATIONS IN A MEMORY BASED ON BLOCK CYCLES AND USE OF SPARE BLOCKS

(71) Applicant: MICRON TECHNOLOGY, INC., Boise, ID (US)

(72) Inventors: Domenico Monteleone, Caserta (IT); Giacomo Bernardi, Marcianise (IT); Luca Porzio, Volla (IT); Graziano Mirichigni, Vimercate (IT); Stefano Zanardi, Seriate (IT); Erminio Di Martino, Quarto (IT)

(73) Assignee: Micron Technology, Inc., Boise, ID (US)

( * ) Notice: Subject to any disclaimer, the term of this patent is extended or adjusted under 35 U.S.C. 154(b) by 32 days.

(21) Appl. No.: 16/523,860

(22) Filed: Jul. 26, 2019

(65) Prior Publication Data
US 2019/0347012 A1   Nov. 14, 2019

Related U.S. Application Data

(62) Division of application No. 14/288,663, filed on May 28, 2014, now Pat. No. 10,365,835.

(51) Int. Cl.
*G06F 3/06* (2006.01)
*G06F 12/02* (2006.01)

(52) U.S. Cl.
CPC ............ *G06F 3/0616* (2013.01); *G06F 3/064* (2013.01); *G06F 3/0653* (2013.01);
(Continued)

(58) Field of Classification Search
CPC ...... G06F 3/0616; G06F 3/064; G06F 3/0653; G06F 3/0679; G06F 12/0246;
(Continued)

(56) References Cited

U.S. PATENT DOCUMENTS

| | | |
|---|---|---|
| 5,287,469 A | 2/1994 | Tsuboi |
| 5,369,616 A | 11/1994 | Wells et al. |

(Continued)

FOREIGN PATENT DOCUMENTS

| | | |
|---|---|---|
| CN | 1497604 A | 5/2004 |
| CN | 1860460 A | 11/2006 |

(Continued)

OTHER PUBLICATIONS

English Translation of Notice of Preliminary Rejection dated Jan. 21, 2019 for Korean application No. 10-2016-7036706.
(Continued)

*Primary Examiner* — Hong C Kim
(74) *Attorney, Agent, or Firm* — Dorsey & Whitney LLP (57) ABSTRACT

Apparatuses and methods for commands to perform wear leveling operations are described herein. An example apparatus may include a memory configured to receive a wear leveling command and to perform a wear leveling operation responsive to the wear leveling command. The memory may further be configured to recommend a wear leveling command be provided to the memory responsive to a global write count exceeding a threshold. The global write count may be indicative of a number of write operations performed by the memory since the memory performed a wear leveling operation.

19 Claims, 7 Drawing Sheets

(52) U.S. Cl.
CPC ........ *G06F 3/0679* (2013.01); *G06F 12/0246* (2013.01); *G06F 2212/1036* (2013.01); *G06F 2212/152* (2013.01); *G06F 2212/2022* (2013.01); *G06F 2212/7211* (2013.01)

(58) Field of Classification Search
CPC ....... G06F 2212/1036; G06F 2212/152; G06F 2212/2022; G06F 2212/7211
USPC ........ 707/693; 714/47.1; 711/103, 154, 156, 711/202, 203, 165; 365/185.29, 185.33, 365/218
See application file for complete search history.

(56) References Cited

U.S. PATENT DOCUMENTS

| | | | |
|---|---|---|---|
| 5,822,244 A | 10/1998 | Hansen et al. | |
| 6,000,006 A * | 12/1999 | Bruce | G06F 11/1068 711/103 |
| 6,026,034 A | 2/2000 | Suzuki et al. | |
| 6,552,956 B2 | 4/2003 | Shibata | |
| 6,629,224 B1 | 9/2003 | Suzuki et al. | |
| 6,879,540 B2 | 4/2005 | Maruyama et al. | |
| 6,996,016 B2 | 2/2006 | Oh | |
| 7,139,673 B1 | 11/2006 | Vashi et al. | |
| 7,579,683 B1 | 8/2009 | Falik et al. | |
| 7,624,209 B1 | 11/2009 | Ansari et al. | |
| 7,865,658 B2 | 1/2011 | Lasser et al. | |
| 8,004,884 B2 | 8/2011 | Franceschini et al. | |
| 8,250,417 B2 * | 8/2012 | Feeley | G11C 29/38 714/718 |
| 8,478,930 B1 * | 7/2013 | Syu | G06F 12/0246 711/103 |
| 8,582,356 B2 | 11/2013 | Abdulla | |
| 8,902,684 B2 | 12/2014 | Kwean | |
| 9,042,156 B2 | 5/2015 | Nakura et al. | |
| 9,734,097 B2 | 8/2017 | Mirichigni et al. | |
| 9,754,648 B2 | 9/2017 | Mirichigni et al. | |
| 10,067,890 B2 | 9/2018 | Mirichigni et al. | |
| 10,163,472 B2 | 12/2018 | Mirichigni et al. | |
| 10,740,263 B2 | 8/2020 | Mirichigni et al. | |
| 10,885,957 B2 | 1/2021 | Mirichigni et al. | |
| 2002/0006074 A1 | 1/2002 | Roohparvar | |
| 2002/0168816 A1 | 11/2002 | Shibata | |
| 2004/0098549 A1 | 5/2004 | Dorst | |
| 2005/0068812 A1 | 3/2005 | Oh | |
| 2006/0028883 A1 | 2/2006 | Shimoyama | |
| 2006/0069812 A1 | 3/2006 | Osborne | |
| 2006/0268619 A1 | 11/2006 | Chen | |
| 2006/0282717 A1 | 12/2006 | Suda | |
| 2007/0005829 A1 | 1/2007 | Fujimoto | |
| 2007/0005922 A1 | 1/2007 | Swaminathan et al. | |
| 2007/0145151 A1 | 6/2007 | Nakamura et al. | |
| 2007/0150688 A1 | 6/2007 | Osborne et al. | |
| 2007/0156991 A1 | 7/2007 | Gould et al. | |
| 2007/0208904 A1 | 9/2007 | Hsieh et al. | |
| 2007/0217253 A1 | 9/2007 | Kim et al. | |
| 2008/0117682 A1 | 5/2008 | Byeon | |
| 2008/0155301 A1 | 6/2008 | Ahvenainen et al. | |
| 2008/0162798 A1 * | 7/2008 | Lofgren | G06F 12/0246 711/103 |
| 2008/0270811 A1 | 10/2008 | Chow et al. | |
| 2008/0313505 A1 * | 12/2008 | Lee | G06F 12/0246 714/47.2 |
| 2008/0320214 A1 | 12/2008 | Ma et al. | |
| 2009/0044190 A1 | 2/2009 | Tringali et al. | |
| 2009/0235025 A1 | 9/2009 | Kondo | |
| 2009/0265514 A1 | 10/2009 | Biles et al. | |
| 2010/0013675 A1 | 1/2010 | Bennett | |
| 2010/0023675 A1 | 1/2010 | Chen et al. | |
| 2010/0124090 A1 | 5/2010 | Arai | |
| 2010/0124102 A1 | 5/2010 | Lee et al. | |
| 2010/0161880 A1 | 6/2010 | You | |
| 2010/0161932 A1 | 6/2010 | Stern et al. | |
| 2010/0172179 A1 | 7/2010 | Gorobets et al. | |
| 2010/0174955 A1 | 7/2010 | Carnevale et al. | |
| 2010/0269118 A1 | 10/2010 | Arimilli et al. | |
| 2011/0035536 A1 | 2/2011 | Shim et al. | |
| 2011/0047319 A1 | 2/2011 | Jeon et al. | |
| 2011/0072190 A1 | 3/2011 | Borracini et al. | |
| 2011/0145483 A1 * | 6/2011 | Sudo | G06F 12/0246 711/103 |
| 2011/0153900 A1 | 6/2011 | Zitlaw | |
| 2011/0170354 A1 | 7/2011 | DeCaro et al. | |
| 2011/0197014 A1 | 8/2011 | Yeh | |
| 2011/0238866 A1 | 9/2011 | Zitlaw | |
| 2011/0289255 A1 | 11/2011 | Wang et al. | |
| 2012/0017053 A1 | 1/2012 | Yang et al. | |
| 2012/0054419 A1 | 3/2012 | Chen et al. | |
| 2012/0066434 A1 | 3/2012 | Zitlaw | |
| 2012/0117303 A1 | 5/2012 | Carannante et al. | |
| 2012/0124317 A1 | 5/2012 | Mirichigni et al. | |
| 2012/0131263 A1 | 5/2012 | Yeh | |
| 2012/0131304 A1 | 5/2012 | Franceschini et al. | |
| 2012/0173809 A1 | 7/2012 | Ko et al. | |
| 2012/0179860 A1 | 7/2012 | Falanga et al. | |
| 2012/0213005 A1 * | 8/2012 | Lee | G11C 16/349 365/185.11 |
| 2012/0216085 A1 | 8/2012 | Weingarten et al. | |
| 2012/0265922 A1 | 10/2012 | Post et al. | |
| 2012/0314498 A1 * | 12/2012 | Feeley | G11C 29/38 365/185.09 |
| 2012/0324141 A1 | 12/2012 | Seong et al. | |
| 2012/0331207 A1 | 12/2012 | Lassa et al. | |
| 2013/0036253 A1 | 2/2013 | Baltar | |
| 2013/0058175 A1 | 3/2013 | Lin et al. | |
| 2013/0159766 A1 | 6/2013 | D'Abreu et al. | |
| 2013/0191704 A1 | 7/2013 | Eleftheriou et al. | |
| 2013/0282967 A1 | 10/2013 | Ramanujan | |
| 2014/0013028 A1 * | 1/2014 | Rametta | G06F 11/3037 711/103 |
| 2014/0082259 A1 | 3/2014 | Yeh | |
| 2014/0089562 A1 | 3/2014 | Deguchi et al. | |
| 2014/0122822 A1 | 5/2014 | Mirichigni et al. | |
| 2014/0136771 A1 | 5/2014 | Cornwell et al. | |
| 2014/0215129 A1 | 7/2014 | Kuzmin et al. | |
| 2014/0281182 A1 | 9/2014 | Mirichigni et al. | |
| 2015/0067232 A1 * | 3/2015 | Fontana | G06F 12/0253 711/103 |
| 2015/0095551 A1 | 4/2015 | Confalonieri et al. | |
| 2015/0100744 A1 | 4/2015 | Mirichigni | |
| 2015/0106551 A1 * | 4/2015 | Kim | G06F 12/0246 711/103 |
| 2015/0363120 A1 * | 12/2015 | Chen | G06F 3/0653 711/103 |
| 2017/0309318 A1 | 10/2017 | Mirichigni et al. | |
| 2017/0329534 A1 | 11/2017 | Mirichigni et al. | |
| 2018/0349302 A1 | 12/2018 | Mirichigni et al. | |
| 2019/0080733 A1 | 3/2019 | Mirichigni et al. | |

FOREIGN PATENT DOCUMENTS

| | | |
|---|---|---|
| CN | 101030166 A | 9/2007 |
| CN | 102789423 A | 11/2012 |
| JP | 2005108395 A | 4/2005 |
| KR | 20090094333 A | 9/2009 |
| KR | 20110014923 A | 2/2011 |

OTHER PUBLICATIONS

International Search Report and Written dated Jul. 14, 2015 received for PCT/US2015/027490.
Notice of Preliminary Rejection dated Mar. 21, 2018 for Korean Application No. 10-2016-7036706.
Restriction Requirement dated Nov. 26, 2018 for Chinese application No. 201580028254.7.
"available" —Definition from Wiktionary, the free dictionary— Archived revision by Tuvalkin (talk | contribs) as of 21:49, Jan. 5, 2012. https://en.wiktionary.org/w/index.php?title=available&oldid=15765189 Downloaded Jan. 13, 2016, Jan. 5, 2012.
English Translation of First Office Action for CN application No. 201580028254.7 dated Mar. 27, 2019 pp. all.

(56) References Cited

OTHER PUBLICATIONS

Notice of Final Rejection for KR application No. 10-2016-7036706 dated Sep. 28, 2018, pp. all.
"JEDEC—Low Power Double Data Rate 2 (LPDDR2)", Feb. 2010.
Qureshi, et al., "Enhancing Lifetime and Security of PCM-Based Main Memory with Start-Gap Wearing Leveling", Microarchitecture, 2009 42nd Annual IEEE/ACM International Symposium, Dec. 12-16, 2009, 14-23.
English translation of Office Action for Application No. 201580028254.7, dated Sep. 18, 2019.
Final Rejection for CN Application No. 201580028254.7, dated Apr. 3, 2020.

* cited by examiner

Fig. 1

| DQ3 | DQ2 | DQ1 | WAIT STATE | | CURRENT READ INSTRUCTION | CURRENT WRITE INSTRUCTION |
|---|---|---|---|---|---|---|
| 0 | 0 | 1 | DEASSERTED | SUCCESS | ACCEPTED | |
| 0 | 1 | 1 | ACKNOWLEDGE (A) | WEAR LEVELING WARNING | ACCEPTED BUT A WEAR LEVELING INSTRUCTION IS SUGGESTED ACTION: ISSUE WL INSTRUCTION | |
| 1 | 0 | 1 | | MULTIPLE WARNING | ACCEPTED BUT THERE HAS BEEN AN ERROR DURING A PREVIOUS OPERATION (E.G. LOCK ERROR) ACTION: CHECK FSR | |
| 1 | 1 | 1 | | ERROR | NA | REJECTED DUE TO AN ERROR (E.G. LOCK ERROR) ACTION: CHECK FSR |

PERFORMING WEAR LEVELING OPERATIONS IN A MEMORY BASED ON BLOCK CYCLES AND USE OF SPARE BLOCKS

CROSS-REFERENCE TO RELATED APPLICATION(S)

This application is a divisional of U.S. patent application Ser. No. 14/288,663, filed May 28, 2014. This application is incorporated by reference herein in its entirety and for any purposes.

BACKGROUND

Memories may be included in a variety of apparatuses, such as computers or other devices, including but not limited to portable memory devices, solid state drives, personal digital assistants, music players, cameras, phones, wireless devices, displays, chip sets, set top boxes, gaming systems, vehicles, and appliances. Memories may be volatile, where power is needed to store date, and non-volatile, where data is stored even if power is not provided to the memory, or combinations of volatile and non-volatile memory. There are many different types of volatile and non-volatile memory including random-access memory (RAM), read only memory (ROM), dynamic random access memory (DRAM), synchronous dynamic random access memory (SDRAM), flash memory, and resistance variable memory, among others.

Memories, such as resistance variable memory devices, may be used as non-volatile memory for a wide range of electronic devices. Resistance variable memory devices may include, for example, phase change memory (PCM) or resistive memory, among others. In some instances, it may be desirable to use PCM to implement random access memory. As a result of the limitations of using PCM as RAM replacement, operation of PCMs in memory systems may be restricted and/or require additional mechanisms for operation. For example, blocks of PCMs may be limited to a relatively low number of write operations compared to RAM and may require additional housekeeping mechanisms (e.g., wear leveling operations, refresh operations) to ensure feasible RAM replacement.

DETAILED DESCRIPTION

Apparatuses and methods for commands to perform wear leveling operations are described herein. Certain details are set forth below to provide a sufficient understanding of embodiments of the invention. However, it will be clear to one having skill in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Figure 1:
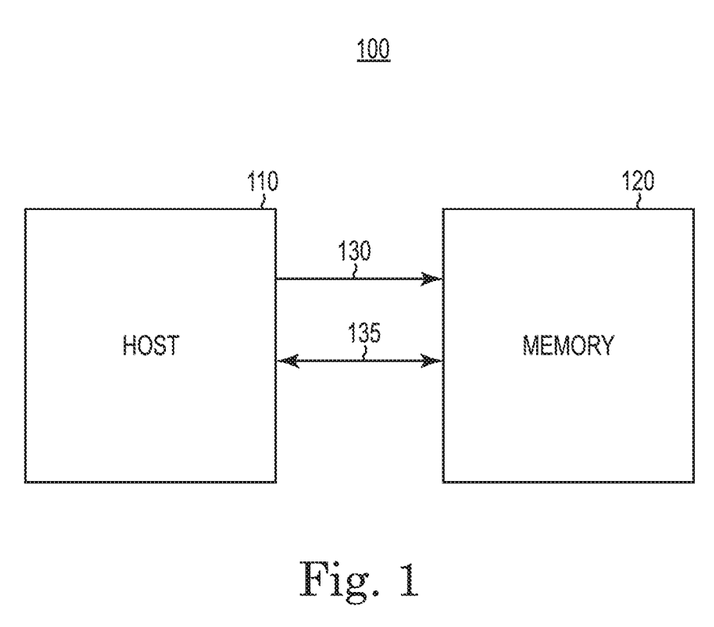
FIG. 1 is a block diagram of an apparatus according to an embodiment of the present invention.

FIG. 1 is a block diagram of an apparatus 100 according to an embodiment of the present invention. The apparatus may comprise circuitry, one or more semiconductor die, a packaged semiconductor, a device including such circuitry, die, or package, and/or a system including such a device. The apparatus 100 may include a host 110 (e.g., memory controller) and a memory 120. The host 110 and the memory 120 may be coupled by a command and address (CA) bus 130 and a data bus 135. The memory 120 may be configured to receive commands and/or addresses from the host 110 over the CA bus 130, and the memory may be configured to receive information and/or provide information over the bus 135. The information received and provided over the bus 135 may include data to be stored by the memory 120 and/or to be provided from memory, for example. Although the host 110 and memory 120 are described as providing signals over the CA bus 130 and the data bus 135, in some examples, a single bus may be used to provide signals. For example, in at least one embodiment, the host 110 may be configured to provide commands, addresses, and data to the memory 120 and receive data from the memory 120, over a single, shared bus.

The memory 120 may be configured to perform operations (e.g., read operations, write operations, or wear leveling operations) in response to received memory commands and/or addresses provided by the host 110. By way of example, the memory 120 may provide data to the host 110 over the data bus 135 responsive to a read command, and may store data received over the data bus 135 responsive to a write command. As another example, the memory 120 may perform a wear leveling operation responsive to a wear leveling command, described further below.

Figure 2:
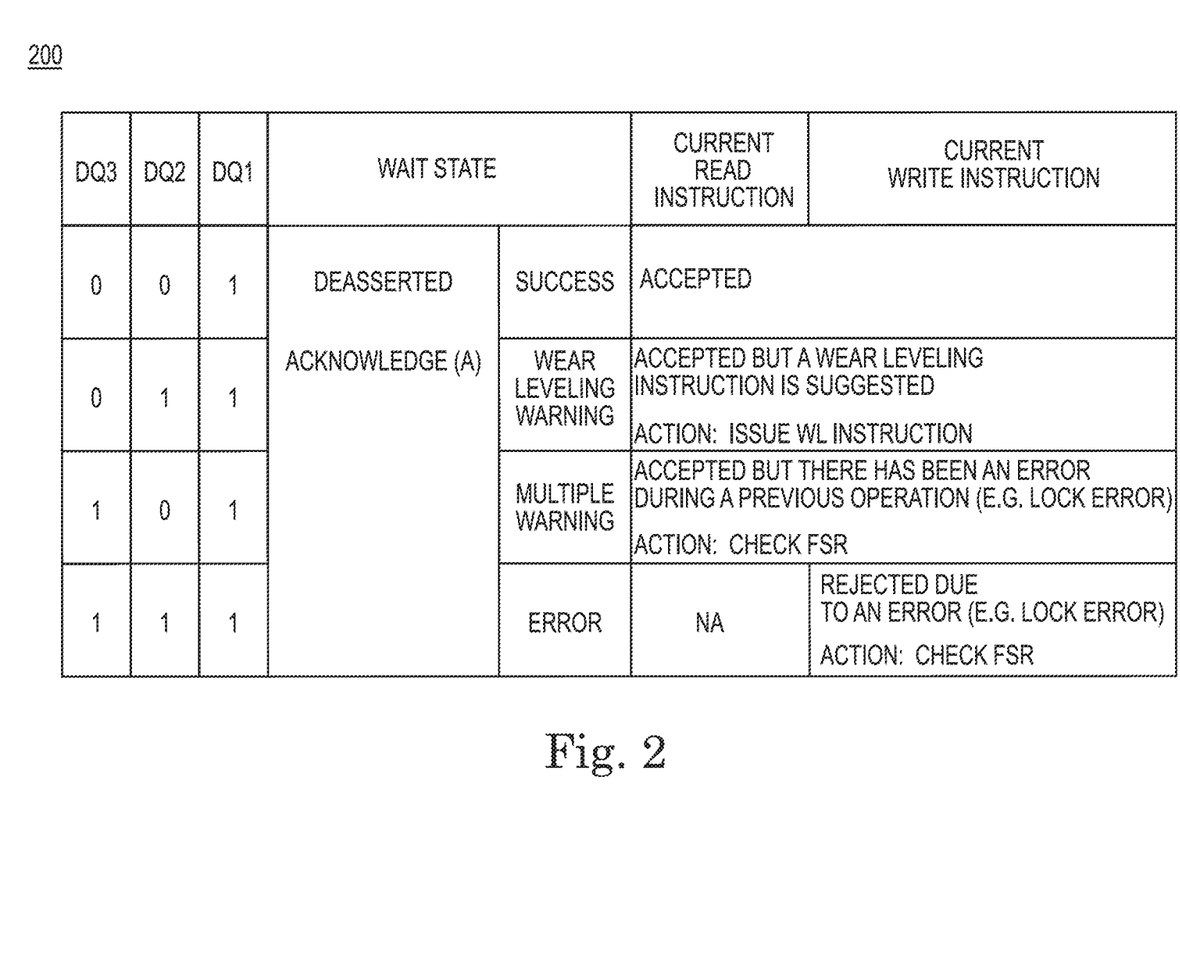
FIG. 2 is a table illustrating example bit assignments of a flag status register according to an embodiment of the present invention.

The memory 120 may further provide information to the host 110 over the data bus 135. Information provided by the memory 120 to the host 110 may, for instance, be included in an acknowledgement provided to the host 110 in response to one or more commands. Acknowledgements may, for instance, be provided following a variable latency period. With reference to FIG. 2, the table 200 illustrates example bit assignments for acknowledgements provided by the memory 120 to the host 110. Generally, an acknowledgement may include information associated with a wait state, e.g., whether a variable latency has ended, and/or may include information associated with one or more current instructions. By way of example, an acknowledgement may indicate that a command, such as a read command or write command, has been accepted and that the memory 120 will perform the command (e.g., "001"). An acknowledgement further may indicate that an error, such as a lock error, has occurred during a previous operation (e.g., "101"). Additionally or alternatively, an acknowledgement may indicate that the memory 120 recommends that the host 110 provide a wear leveling command (e.g., "011").

In some examples, the memory 120 may be configured to track write operations performed by the memory 120. In particular, the memory 120 may track a "global write count," or the number of write operations performed by the memory 120 since the memory 120 last performed a wear leveling operation. Once the global write count has exceeded a threshold, the memory 120 may recommend the host 110 provide a wear leveling command. In some instances, the memory 120 may selectively ignore wear leveling commands based on the global write count. The memory 120 may, for instance, ignore wear leveling commands if the global write count does not exceed a threshold.

Additionally or alternatively, in some examples, the memory 120 may be configured to track a number of write operations performed on each block of an array associated with the memory 120. In particular, the memory 120 may track a "local write count" for each block, or a number of write operations performed by the memory 120 on each block since the memory 120 last performed a wear leveling operation. Once a local write count has exceeded a threshold, the memory 120 may recommend the host 110 provide a wear leveling command, and in some instances, the memory 120 may selectively ignore wearing commands based on the local write count. In this manner, the memory 120 may recommend the host 110 provide a wear leveling command in response to performing an operation at a particular block (e.g., maximum cycled block) a particular number of times since last performing a wear leveling operation.

Figure 3:
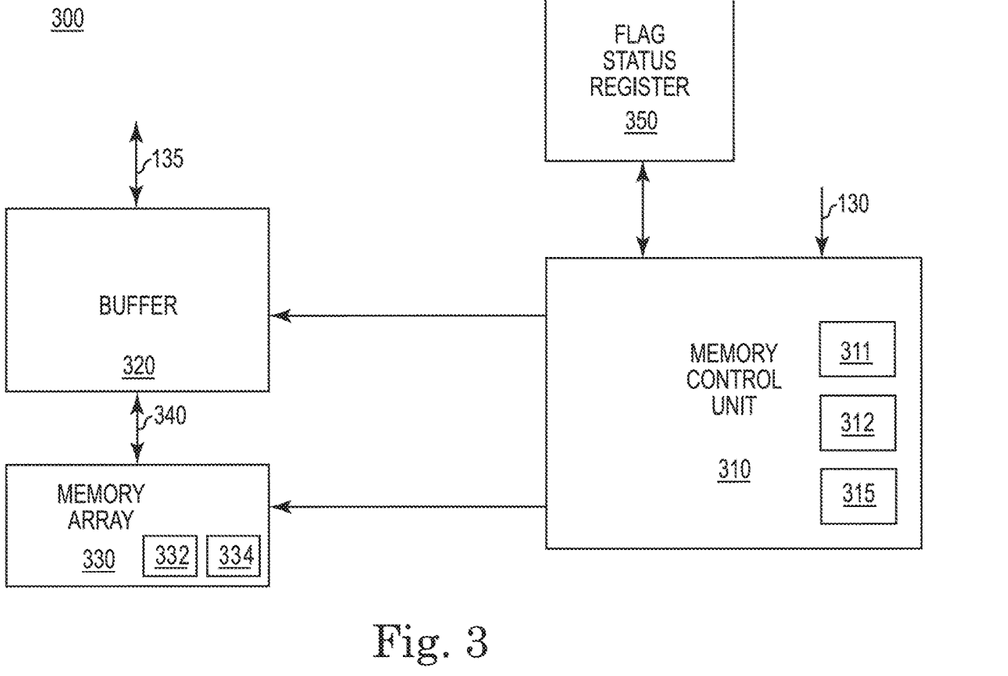
FIG. 3 is a block diagram of a memory according to an embodiment of the present invention.

FIG. 3 is a block diagram of a memory 300 according to an embodiment of the present invention. The memory 300 may be used to implement, at least in part, the memory 120 of FIG. 1. The memory 300 may include a memory control unit 310, a buffer 320, an array 330, and a flag status register 350. The memory 300 may include elements that have been previously described with respect to the apparatus 100 of FIG. 1. Those elements have been identified in FIG. 3 using the same reference numbers used in FIG. 1 and operation of the common elements is as previously described. Consequently, a detailed description of the operation of these elements will not be repeated in the interest of brevity.

The memory control unit 310 may be configured to control operation of the one or more components of the memory 300. By way of example, the memory control unit 310 may be coupled to the buffer 320 and the array 330 and may be configured to control operation of the buffer 320 and the array 330. The memory control unit 310 may be configured to receive commands and addresses from the CA bus 130 and the buffer 320 may be configured to receive information from the data bus 135 and provide information to the data bus 135. The memory control unit 310 may be configured to cause data (e.g., write data or read data) to be provided between the buffer 320 and the array 330 over the data bus 340 in response to received commands and addresses. For example, in response to a write command, the memory control unit 310 may cause write data to be provided from the buffer 320 to the array 330. Similarly, in response to a read command, the memory control unit 310 may cause read data to be provided from the array 330 to the buffer 320.

The memory control unit 310 may further be configured to perform wear leveling operations. Generally, the memory control unit 310 may be configured to perform wear leveling operations in accordance with static wear leveling, dynamic wear leveling, or a combination thereof. Accordingly, performing a wear leveling operation may include reallocating data between various blocks of the memory array 330 and/or reassigning one or more addresses (e.g., block addresses) corresponding thereto. In some examples, performing a wear leveling operation may include storing addresses in one or more address registers 312. The address registers 312 may be volatile or non-volatile registers and may be included in the memory control unit 310, as illustrated, and/or may be located in one or more other components of the memory 300.

The memory control unit 310 may include wear leveling logic 315 for performing a wear leveling operation. The wear leveling logic 315 may be implemented in hardware, software, or combinations thereof. By way of example, the memory control unit 310 may be implemented, at least in part, using a controller, and the wear leveling logic 315 may be stored in non-volatile memory of the controller as one or more computer-readable instructions executable by one or more processing units (e.g., processors) of the memory control unit 310.

In some embodiments, the memory control unit 310 may further be configured to set one or more status bits of a register. For example, the memory control unit 310 may be configured to set a bit of the flag status register 350 having a logic state indicating whether a wear leveling operation is being performed (e.g., the bit of the flag status register 350 having a logic state of "1"). In another example, the memory control unit 310 may be configured to set a bit of the flag status register 350 indicating whether a wear leveling operation is recommended (e.g., the bit of the flag status register 350 having a logic state of "1"). Acknowledgements provided to the host 110 may be based on one or more bits of the flag status register, and accordingly, whether an acknowledgement recommends the host 110 provide a wear leveling command may be based on a bit of the flag status register 350. The bit of the flag status register 350 indicating whether a wear leveling operation is recommended may be set by the memory control unit 310 based on a number of write commands performed since a wear leveling operation was last performed. Additionally or alternatively, the logic state of the bit written by the memory control unit 310 may be set based on an amount of time since a wear leveling operation was performed. The memory 110 may provide information indicative of the state of each bit of the flag status register 350 in response to a read flag status register (RFSR) command to the memory 300.

As described, the memory 300 may track (e.g., count) a global write count indicative of the number of write operations performed by the memory 300 since a wear leveling operation was last performed by the memory 300 and/or may track local write counts indicative of the number of write operations performed at each block of an array associated with the memory 300, such as the array 330. By way of example, the global write count and/or the local write counts may be tracked using a counter 311 located in the memory control unit 310. Responsive to the global write count and/or a local write count exceeding a threshold, the memory control unit 310 may recommend the host 110 provide a wear leveling command. In some examples, the counter 311 may alternatively be stored in the buffer 320, or any other component of the memory 300.

Further, while the memory control unit 310 may perform wear leveling operations in response to commands provided by the host 110, in some instances the memory control unit 310 may automatically perform wear leveling operations. By way of example, the memory control unit 310 may perform a wear leveling operation in response to the global write count exceeding a threshold. The global write count threshold causing the memory control unit 310 to automatically perform a wear leveling operation may exceed the global write count threshold causing the memory control unit 310 to recommend the host 110 provide a wear leveling command. As an example, a global write count of 10,000 write operations may cause the memory control unit 310 to recommend the host 110 provide a wear leveling command, for instance by setting a bit of the flag status register 350 having an appropriate logic state, and a global write count of 100,000 write operations may cause the memory control unit to automatically perform a wear leveling operation. As another example, the memory control unit 310 may perform a wear leveling operation in response to a local write count exceeding a threshold. A local write count threshold causing the memory control unit 310 to automatically perform a wear leveling operation may exceed the local write count threshold causing the memory control unit 310 to recommend the host 110 provide a wear leveling command. In other examples, the memory control unit 310 may not automatically perform wear leveling operations, or the memory control unit 310 may be configured to selectively perform wear leveling operations automatically, for instance, based on a control signal or command provided by the host 110.

The array 330 may comprise any array known in the art, now or in the future, and as described, may be divided into blocks. The array 330 may include a volatile portion of memory, a non-volatile portion of memory (e.g., PCM memory), or a combination thereof. The array 330 may include a data structure for tracking various attributes of the array 330 over time. By way of example, the array 330 may include an address map 332 that includes information specifying the relationship between logical addresses of the array 330 and physical addresses of the array 330. The logical addresses may be related to the addresses provided to the memory by the host, such as the addresses associated with a read command and a write command. As another example, the array 330 may include a write count map 334 that includes information that may indicate a number of write operations performed on each block of the array 330, for instance, over a life of the array 330. In some examples, the address map 332 and the write count map 334 may additionally or alternatively be stored in the memory control unit 310. The memory control unit 310 may be configured to read and/or modify the address map 332 and the write count map 334.

Figure 4:
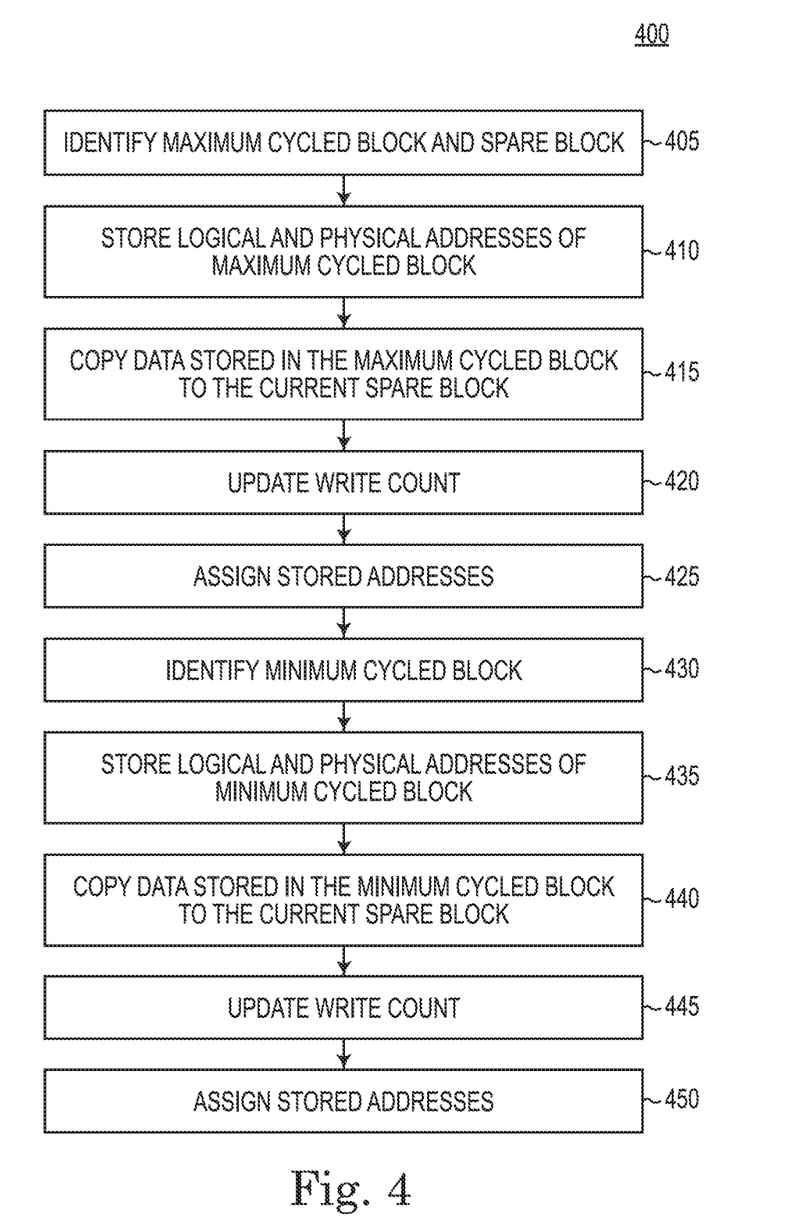
FIG. 4 is a flowchart of a method for performing a wear leveling operation according to an embodiment of the present invention.

FIG. 4 is a flowchart 400 of a method for performing a wear leveling operation according to an embodiment of the present invention. The method may be implemented using a memory control unit, such as the memory control unit 310 and of FIG. 3, and an array, such as the array 330 of FIG. 3. The method 400 is described herein with reference to FIGS. 5A-5F which may further illustrate block address mapping arrangements during a wear leveling operation. Each of the FIGS. 5A-5F illustrate an address map 502, a physical array 504, a write count map 506, and address registers 508. The address map 502 stores logical addresses 502 LOG0-LOG7 and associated physical addresses 502 PHYS0-PHYS7. The address map 502, write count map 506, and registers 508 may be used to implement the address map 332, the write count map 334, and the address registers 312 of FIG. 3, respectively. For example, logical address LOG4 corresponds to physical address PHYS4 that at a given time may point to BLOCK3, the write count of which is stored in COUNT3.

Figure 5A:
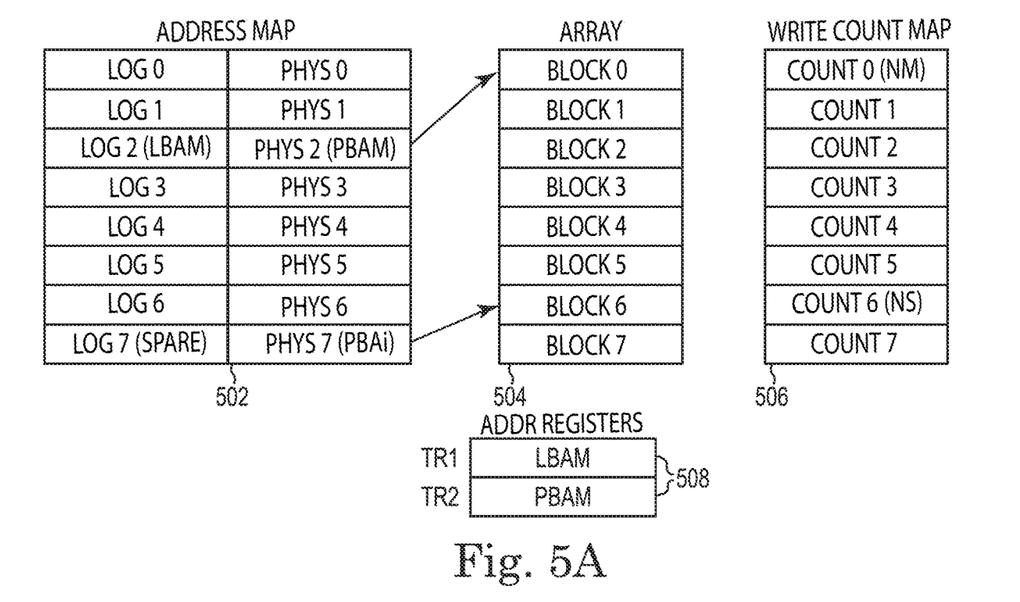
FIG. 5A is a schematic diagram of an initial block address mapping arrangement during a wear leveling operation according to an embodiment of the present invention.

At step 405, the memory control unit 310 may identify a maximum cycled block and a spare block of the array 504. The maximum cycled block may be a block having a highest write count of each of the blocks array 504 as indicated by the write count map 506. The spare block may be any block in the array 504 that may be used as a spare wear leveling block. The spare block may be any block not storing any data and/or blocks designated as not storing persistent data.

With reference to FIG. 5A, identifying the maximum cycled block and a spare block may include identifying a logical address and/or physical address in the address map 502 for each of the maximum cycled block and spare block. By way of example, the memory control unit 310 may identify a highest count in the write count map 506, the write count NM, to identify the maximum cycled block of the array 504. In some examples, the maximum cycled block may be identified from blocks of the array 504 designated as swappable. A block may be designated as swappable, for instance, based on a "swap write count" of the block, or a number of write operations performed on the block since the block was last assigned a new block address (e.g., logical block address) in accordance with a wear leveling operation. By way of example, in at least one embodiment, a block may be designated as swappable when a swap write count of the block exceeds a threshold. The swap write count of each block may be stored in the write count map 506 and/or in one or more registers (not shown).

In turn, the memory control unit 310 may identify a logical address LBAM and a physical address PBAM in the address map 502 associated with the identified maximum cycled block. Similarly, the memory control unit 310 may identify a spare block and identify a logical address SPARE and a physical address PBAi associated with the identified spare block. At step 410, the memory control unit 310 may store the logical address LBAM and the physical address PBAM in the address registers 508. As illustrated in FIG. 5A, the maximum cycled block is BLOCK0 and the spare block is BLOCK6 of the array 504.

Figure 5B:
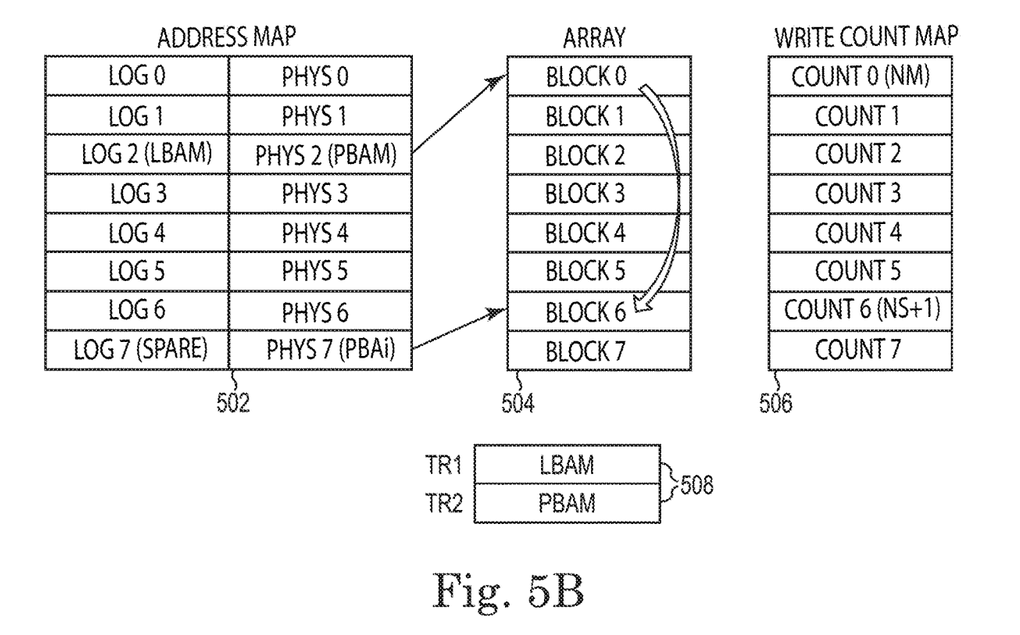
FIG. 5B is a schematic diagram of an intermediate block address mapping arrangement during a wear leveling operation according to an embodiment of the present invention.

With reference to FIG. 5B, at step 415, the memory control unit 310 may copy data stored in the maximum cycled block BLOCK0 to the spare block BLOCK6, and at step 420, the memory control unit 310 may update (e.g., increment) the write count NS associated with the spare block BLOCK6.

Figure 5C:
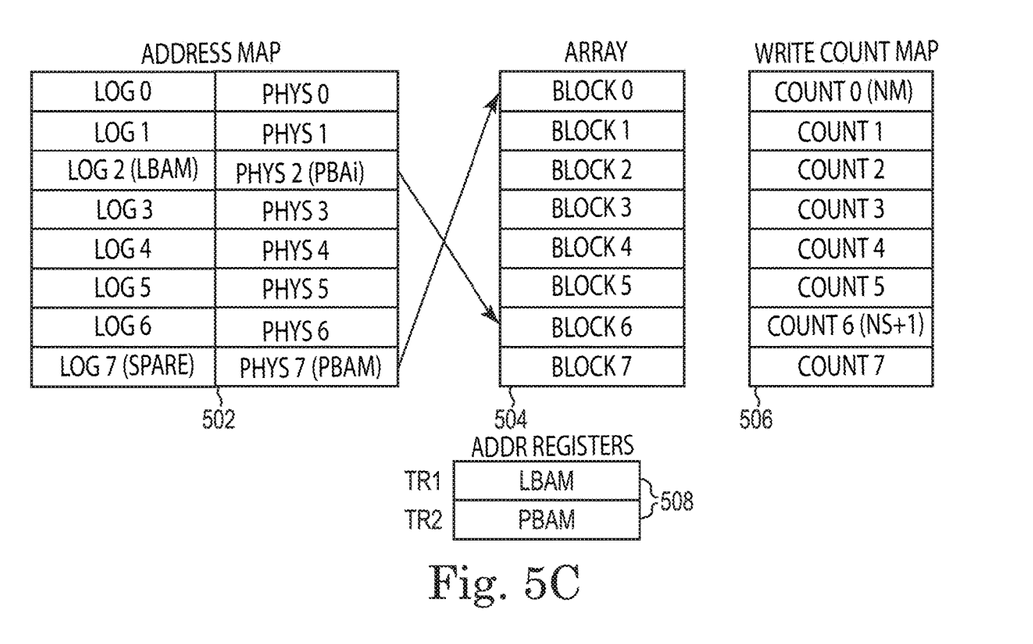
FIG. 5C is a schematic diagram of an intermediate block address mapping arrangement during a wear leveling operation according to an embodiment of the present invention.

With reference to FIG. 5C, at step 425, the memory control unit 310 may assign the addresses stored in the address registers 508, in particular, the logical address LBAM and the physical address PBAM. The addresses may be assigned such that the logical address SPARE is associated with the physical address PBAM and the logical address LBAM is associated with the physical address PBAi. In this manner, the physical addresses mapped to the logical addresses LBAM, SPARE may be switched relative to the arrangement of FIG. 5A. Accordingly, the maximum cycled block BLOCK0 of the array 504 may be assigned as the spare block of the array 504.

Figure 5D:
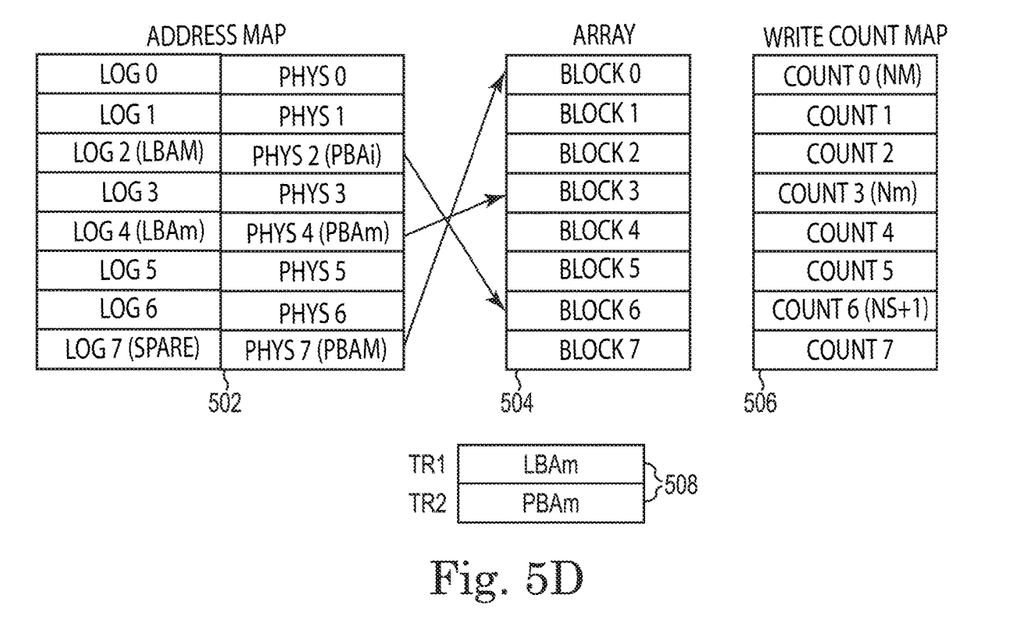
FIG. 5D is a schematic diagram of an intermediate block address mapping arrangement during a wear leveling operation according to an embodiment of the present invention.

At step 430, the memory control unit 310 may identify a minimum cycled block. The minimum cycled block may be a block having a lowest write count of each of the blocks BLOCK0-BLOCK7 of array 504 as indicated by the write count map 506. With reference to FIG. 5D, identifying the minimum cycled block may include identifying a logical address and/or physical address for the minimum cycled block. By way of example, the memory control unit 310 may identify a lowest count in the write count map 506, the write count Nm, to identify the minimum cycled block of the array 504. BLOCK3 is identified in FIG. 5D as the minimum cycled block of the array 504. In turn, the memory control unit 310 may identify a logical address LBAm and a physical address PBAm in the address map 502 associated with the identified minimum cycled block. At step 435, the memory control unit 310 may store the logical address LBAm and the physical address PBAm in the address registers 508.

Figure 5E:
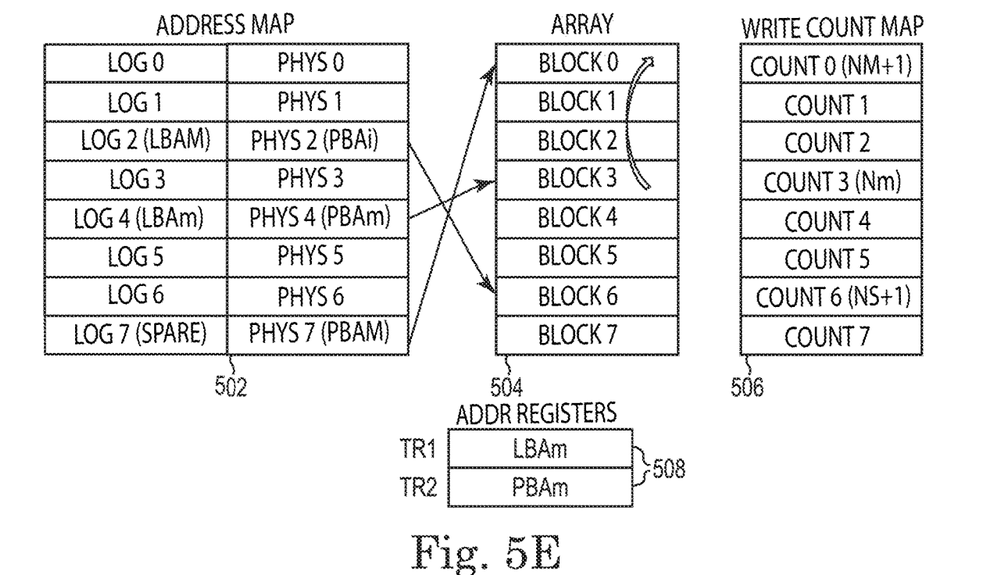
FIG. 5E is a schematic diagram of an intermediate block address mapping arrangement during a wear leveling operation according to an embodiment of the present invention.

With reference to FIG. 5E, at step 440, the memory control unit 310 may copy data stored in the minimum cycled block to the spare block, and at step 445, may update the write count NM associated with the spare block.

Figure 5F:
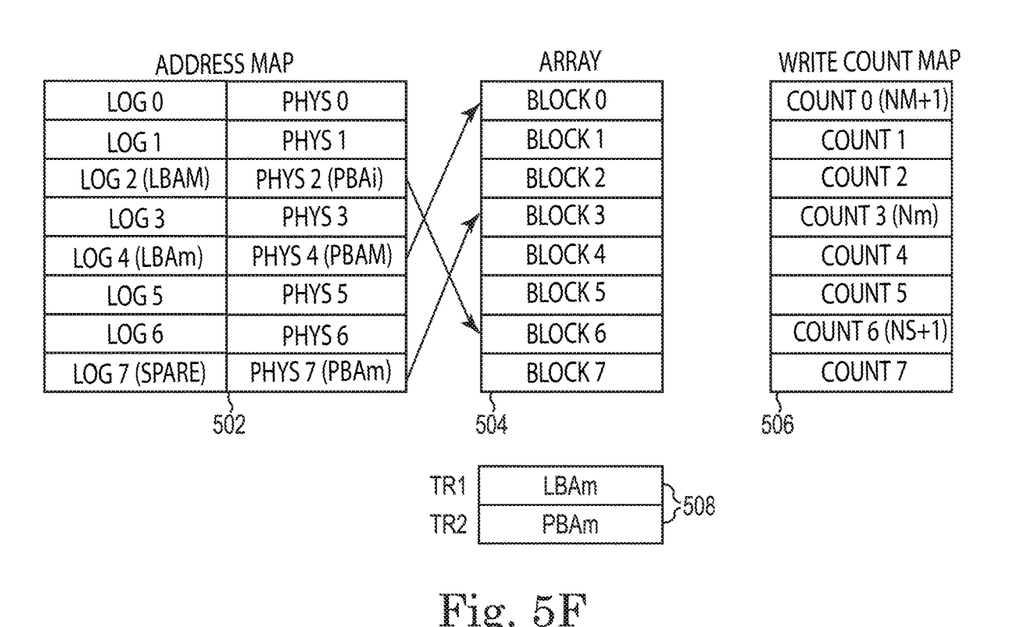
FIG. 5F is a schematic diagram of a final block address mapping arrangement during a wear leveling operation according to an embodiment of the present invention.

With reference to FIG. 5F, at step 450, the memory control unit 310 may assign the addresses stored in the address registers 508, the logical address LBAm and the physical address PBAm. The addresses may be assigned such that the logical address SPARE is associated with the physical address PBAm and the logical address LBAm is associated with the physical address PBAM. In this manner, the physical addresses mapped to the logical addresses LBAm, SPARE may be switched relative to the arrangement of FIG. 5D. Accordingly, the minimum cycled block BLOCK3 of the array 504 may be assigned as the spare block of the array 504.

Accordingly, the memory control unit 310 may perform a wear leveling operation such that the logical address LBAm may be associated with the physical address PBAM and thus the maximum cycled block of the array 504. Additionally, the logical address SPARE may be associated with the physical address PBAm and thus the minimum cycled block BLOCK3 of the array 504, and the logical address LBAM may be associated with the physical address PBAi and thus becoming the spare block of the array 504. Assigning addresses in this manner may, for instance, more evenly distribute write operations among blocks BLOCK0-BLOCK7 of the array 504 and thereby provide prolonged operation of the array 504.

While the method 400 has been described as including particular steps in a particular order, in some examples, steps of the method 400 may be performed in any order and further may include additional steps and/or omit one or more described steps. In some examples, for instance, the maximum and minimum cycled blocks may be identified at a same time and logical and/or physical addresses of the maximum and minimum cycled blocks may be stored simultaneously in address registers 508.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus, comprising:
  an array;
  a memory control unit coupled to the array and configured to receive a wear leveling command and to perform a wear leveling operation responsive to the wear leveling command, the memory control unit further configured to perform the wear leveling operation such that a logical address associated with a maximum cycled block of the array is assigned to a spare block of the array and a logical address associated with a minimum cycled block of the array is assigned to the maximum cycled block of the array; and
  a flag status register including a first bit indicative of whether the memory control unit is performing a wear leveling operation and a second bit indicative of whether the wear leveling operation is recommended based on a global and/or a local write count,
  wherein the memory control unit is further configured to place the first bit in a first state when the memory control unit is performing the wear leveling operation and to place the first bit in a second state when the memory control unit completes the wear leveling operation, wherein the memory control unit is further configured to place the second bit in a first state when the memory control unit recommends the wear leveling operation and to place the second bit in a second state when the memory control unit determines no wear leveling operation is recommended.

2. The apparatus of claim 1, wherein the memory control unit is further configured to provide the state of the first bit and the second bit responsive to a read flag status register command.

3. The apparatus of claim 1, wherein the memory control unit is configured to automatically perform a wear leveling operation responsive to a global write count exceeding a threshold.

4. The apparatus of claim 1, wherein the memory control unit is configured to automatically perform a wear leveling operation responsive to a local write count exceeding a threshold.

5. The apparatus of claim 1, wherein the memory control unit is configured to identify the logical address associated with the maximum cycled block of the array and the logical address associated with the minimum cycled block of the array using an address map,
  wherein the memory control unit includes a plurality of address registers configured to store the logical address associated with the maximum cycled block of the array and the logical address associated with the minimum cycled block of the array during the wear leveling operation.

6. The apparatus of claim 1, wherein the array comprises non-volatile memory.

7. The apparatus of claim 1, wherein memory control unit is configured to identify the maximum cycled block of the array and the minimum cycled block of the array using a count map of the array.

8. The apparatus of claim 1, wherein the memory control unit is configured to selectively ignore the wear leveling command based on a global write count.

9. The apparatus of claim 1, wherein the memory control unit includes wear leveling logic for performing the wear leveling operation.

10. The apparatus of claim 1, wherein the array comprises an address map configured to map the logical address associated with the maximum cycled block of the array to a physical address of a first block of the array and to map the logical address associated with the minimum cycled block of the array to a physical address of a second block of the array.

11. The apparatus of claim 1, wherein the array comprises a write count map indicative of a number of write operations performed on each block of the array over a life of the array.

12. A method, comprising:
- transitioning a first bit of a flag status register from a first state to a second state to indicate a wear leveling operation is recommended based on a global and/or a local write count, wherein, while in the first state, the first bit indicates no wear leveling operation is recommended;
- receiving a wear leveling command; and
- selectively performing a wear leveling operation responsive to the wear leveling command, the wear leveling operation including:
- setting a second bit of a flag status register to a first state while performing the wear leveling operation;
- identifying a maximum cycled block, a minimum cycled block, and a spare block of an array;
- assigning a logical address of the minimum cycled block to a physical address of the maximum cycled block;
- assigning a logical address of the spare block to a physical address of the minimum cycled block;
- assigning a logical address of the maximum cycled block to a physical address of the spare block; and
- setting the second bit of the flag status register to a second state in response to completion of the wear leveling operation.

13. The method of claim 12, wherein identifying a maximum cycled block, a minimum cycled block, and a spare block of an array comprises identifying a highest write count and a lowest write count of a count map of an array.

14. The method of claim 12, wherein selectively performing a wear leveling operation responsive to the wear leveling command comprises determining whether a global write count exceeds a threshold.

15. The method of claim 12, further comprising providing an acknowledgment recommending a host provide the wear leveling command based on the first bit of the flag status register being set.

16. The method of claim 12, wherein assigning a logical address of an address map to a physical address of the address map, the address map stored in non-volatile memory of an array.

17. The method of claim 12, wherein identifying a maximum cycled block, a minimum cycled block, and a spare block of an array includes identifying the maximum cycled block from a plurality of blocks designated as swappable.

18. The method of claim 12, further comprising storing the logical address associated with the maximum cycled block of the array and the logical address associated with the minimum cycled block of the array during the wear leveling operation.

19. The method of claim 12, wherein selectively performing a wear leveling operation responsive to the wear leveling command comprises determining whether a local write count exceeds a threshold.

* * * * *